(12) United States Patent
Kondo

(10) Patent No.: US 9,729,031 B2
(45) Date of Patent: Aug. 8, 2017

(54) WINDING APPARATUS AND WINDING METHOD

(71) Applicant: NITTOKU ENGINEERING CO., LTD., Saitama-shi, Saitama (JP)

(72) Inventor: Koji Kondo, Fukushima (JP)

(73) Assignee: NITTOKU ENGINEERING CO., LTD., Saitama-Shi, Saitama (JP)

( * ) Notice: Subject to any disclaimer, the term of this patent is extended or adjusted under 35 U.S.C. 154(b) by 238 days.

(21) Appl. No.: 14/428,908

(22) PCT Filed: Aug. 26, 2013

(86) PCT No.: PCT/JP2013/072766
§ 371 (c)(1),
(2) Date: Mar. 17, 2015

(87) PCT Pub. No.: WO2014/045807
PCT Pub. Date: Mar. 27, 2014

(65) Prior Publication Data
US 2015/0236572 A1    Aug. 20, 2015

(30) Foreign Application Priority Data

Sep. 20, 2012 (JP) ................. 2012-206683

(51) Int. Cl.
*H02K 15/00* (2006.01)
*H02K 15/06* (2006.01)
*H02K 15/085* (2006.01)

(52) U.S. Cl.
CPC ......... *H02K 15/066* (2013.01); *H02K 15/085* (2013.01)

(58) Field of Classification Search
CPC ...... H02K 15/066; H02K 15/085; H02K 3/12; H01F 41/088
USPC ...................................... 242/433.4
See application file for complete search history.

(56) References Cited

U.S. PATENT DOCUMENTS

| | | | | |
|---|---|---|---|---|
| 3,927,456 A | * | 12/1975 | Dammar | H02K 15/09 242/433.3 |
| 4,340,186 A | * | 7/1982 | Shimada | B65H 54/10 140/92.1 |
| 6,127,652 A | * | 10/2000 | Becherucci | H02K 15/09 219/145.1 |

(Continued)

FOREIGN PATENT DOCUMENTS

| | | |
|---|---|---|
| JP | 2000-245120 A | 9/2000 |
| JP | 2003-061320 A | 2/2003 |

(Continued)

*Primary Examiner* — Emmanuel M Marcelo
(74) *Attorney, Agent, or Firm* — Rabin & Berdo, P.C.

(57) ABSTRACT

A winding apparatus includes a pair of first latch pawls provided with a distance therebetween so as to sandwich one of magnetic poles of a multi-pole armature, a flyer that is configured to feed a wire while rotating around the pair of first latch pawls so as to loop and wind the wire around the pair of first latch pawls, and a first moving mechanism that is configured to move the pair of first latch pawls to a position of sandwiching the one of the magnetic poles, and insert the wire wound around the pair of first latch pawls into slots formed between the magnetic poles so that the wire is wound around the one of the magnetic poles.

5 Claims, 14 Drawing Sheets

(56) References Cited

U.S. PATENT DOCUMENTS

| | | | | |
|---|---|---|---|---|
| 2004/0055139 A1* | 3/2004 | Kuroyanagi | ....... | H02K 15/0037 29/596 |
| 2005/0061907 A1* | 3/2005 | Hashimoto | .......... | H02K 15/022 242/443 |
| 2015/0243436 A1* | 8/2015 | Kondo | ................. | H02K 15/085 29/605 |

FOREIGN PATENT DOCUMENTS

| | | |
|---|---|---|
| JP | 2003-169455 A | 6/2003 |
| JP | 2003-348802 A | 12/2003 |
| JP | 2011-130554 A | 6/2011 |
| WO | WO 03-012962 A1 | 2/2003 |

\* cited by examiner

US 9,729,031 B2

WINDING APPARATUS AND WINDING METHOD

TECHNICAL FIELD

The present invention relates to a winding apparatus and a winding method for winding a coil-forming wire around each magnetic pole of a multi-pole armature.

BACKGROUND ART

A coil constituted by a wound wire is typically formed on a magnetic pole of a multi-pole armature. As a conventional method of forming the coils, as disclosed in JP 2000-245120 A, a method using a device called an inserter has been known. Further, as disclosed in JP 2003-169455 A, there has been known a method of causing a nozzle, which is capable of feeding a wire, to circle around each magnetic pole so that the wire fed from the nozzle is directly wound around the magnetic pole. In the method using the inserter as disclosed in JP 2000-245120 A, while the wire previously wound into a ring shape is pulled from one end portion of the multi-pole armature in an axial direction thereof, the wire is inserted into slots formed between the magnetic poles. Finally, the wire wound into a ring shape is fitted onto the magnetic pole of the multi-pole armature.

SUMMARY OF INVENTION

According to this inserter method, the ring-shaped wound wire is pulled in the axial direction of the multi-pole armature, and thus is deformed into an elongate shape. While being pulled from the end portion of the multi-pole armature, the wire that is thus deformed to elongate straight is inserted into straight slots formed between the magnetic poles. Accordingly, there is a fear in that the wire is stretched due to the pulling. Further, the stretched wire is inserted into the slots while being rubbed against the slots in a longitudinal direction, and hence the wire may be damaged due to the rubbing.

In contrast, in the method of directly winding the wire fed from the nozzle around each magnetic pole as disclosed in JP 2003-169455 A, damage that may be caused by the stretching and rubbing of the wire is less likely to occur. However, for example, in the multi-pole armature for use in a resolver, slots into which the wire is to be inserted sometimes have a narrow width. In a case where the slots have a narrow width as described above, the nozzle cannot enter insides of the slots, and hence the nozzle sometimes cannot circle around each magnetic pole. Accordingly, the multi-pole armature having the slot, into which the nozzle cannot enter, has a problem in that the wire fed from the nozzle cannot be directly wound around each magnetic pole.

The present invention has an object to provide a winding apparatus and a winding method capable of forming a coil from a wire wound around each magnetic pole of a multi-pole armature without damaging the wire.

According to one aspect of the present invention, a winding apparatus includes a pair of first latch pawls provided with a distance therebetween so as to sandwich one of magnetic poles of a multi-pole armature, a flyer that is configured to feed a wire while rotating around the pair of first latch pawls so as to loop and wind the wire around the pair of first latch pawls, and a first moving mechanism that is configured to move the pair of first latch pawls to a position of sandwiching the one of the magnetic poles, and insert the wire wound around the pair of first latch pawls into slots formed between the magnetic poles so that the wire is wound around the one of the magnetic poles.

DESCRIPTION OF EMBODIMENT

Now, an embodiment of the present invention is described with reference to the accompanying drawings.

Figure 1:
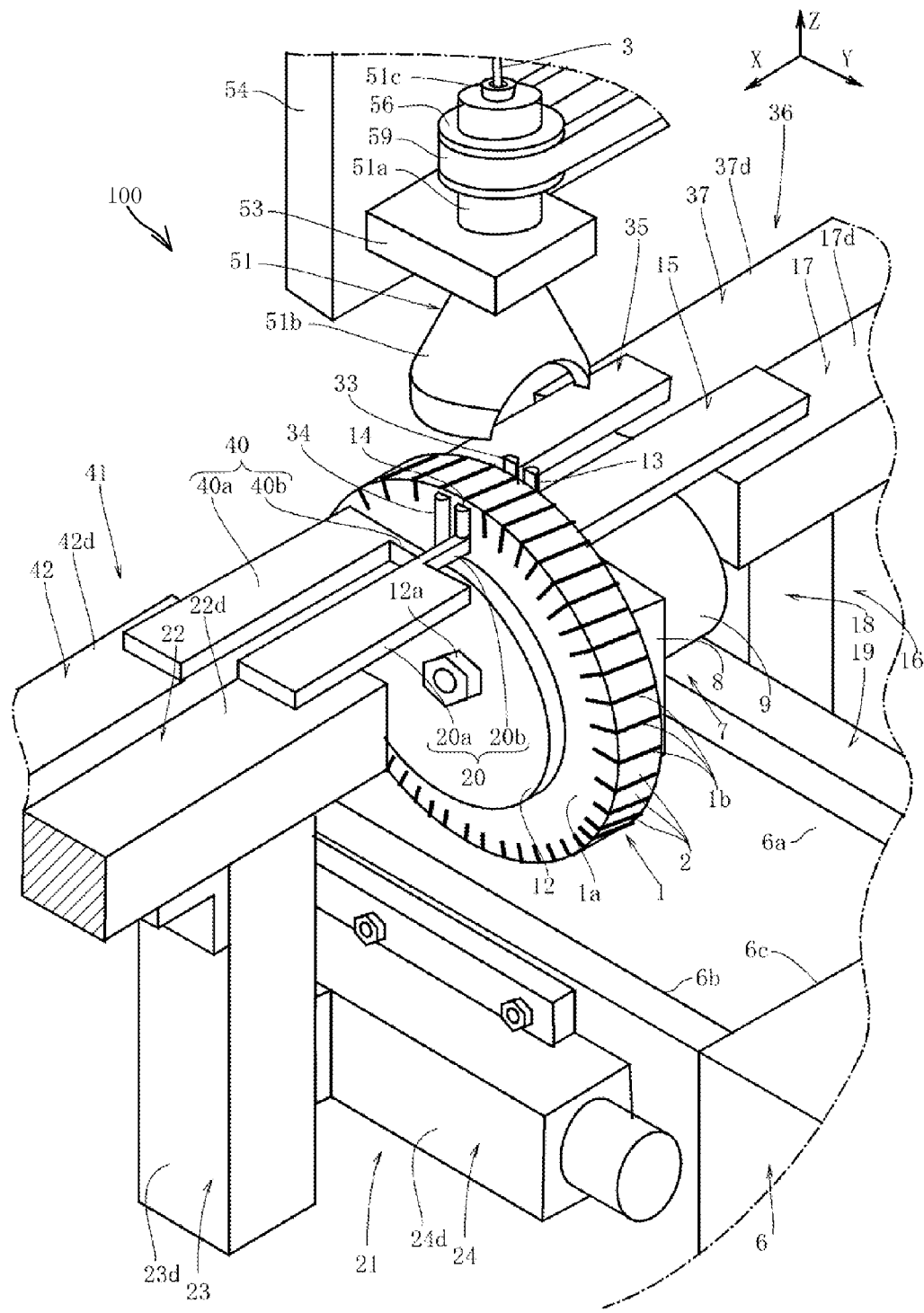
FIG. 1 is a perspective view of a winding apparatus according to an embodiment of the present invention.
Figure 2:
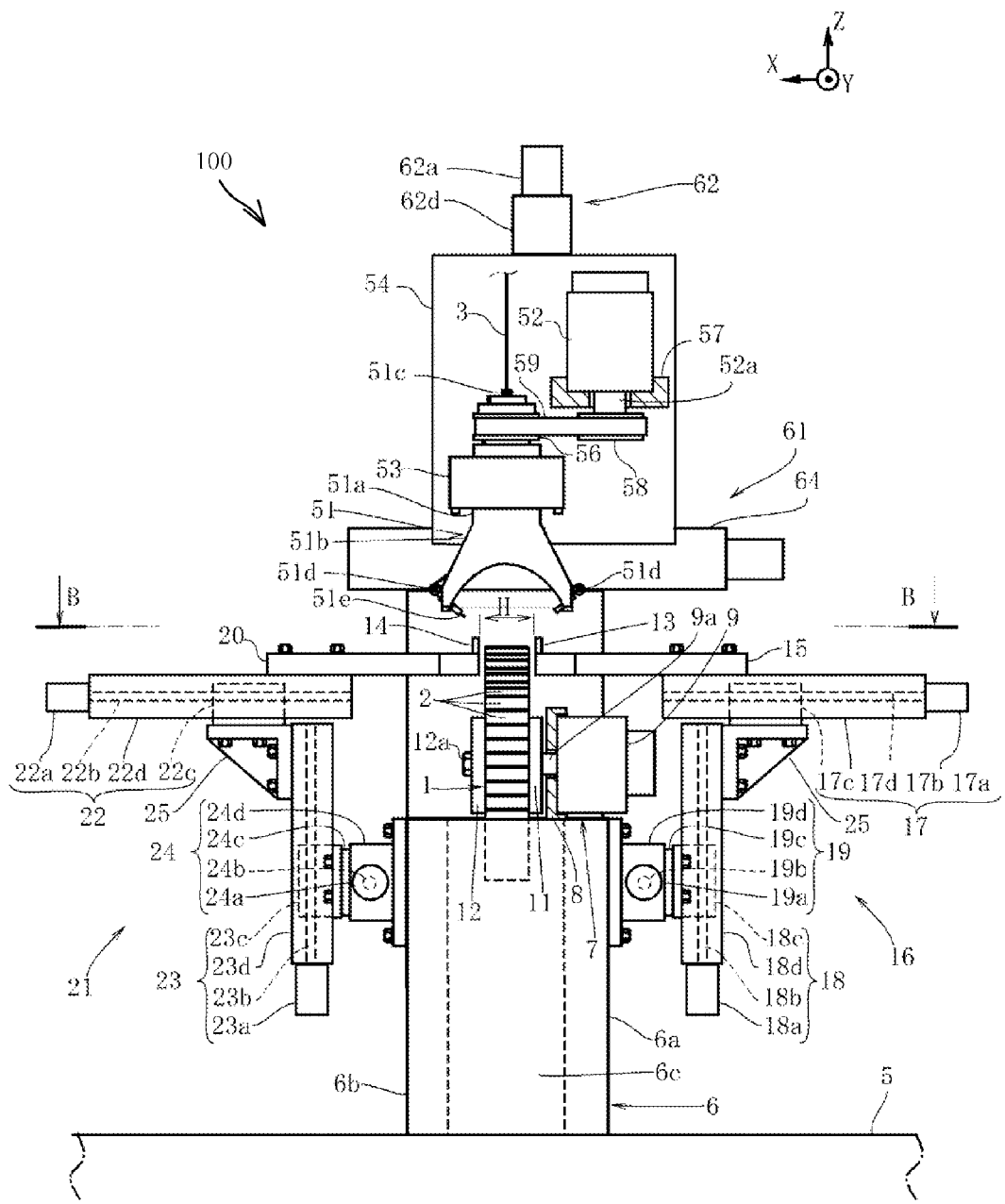
FIG. 2 is a front view of the winding apparatus according to the embodiment of the present invention.
Figure 3:
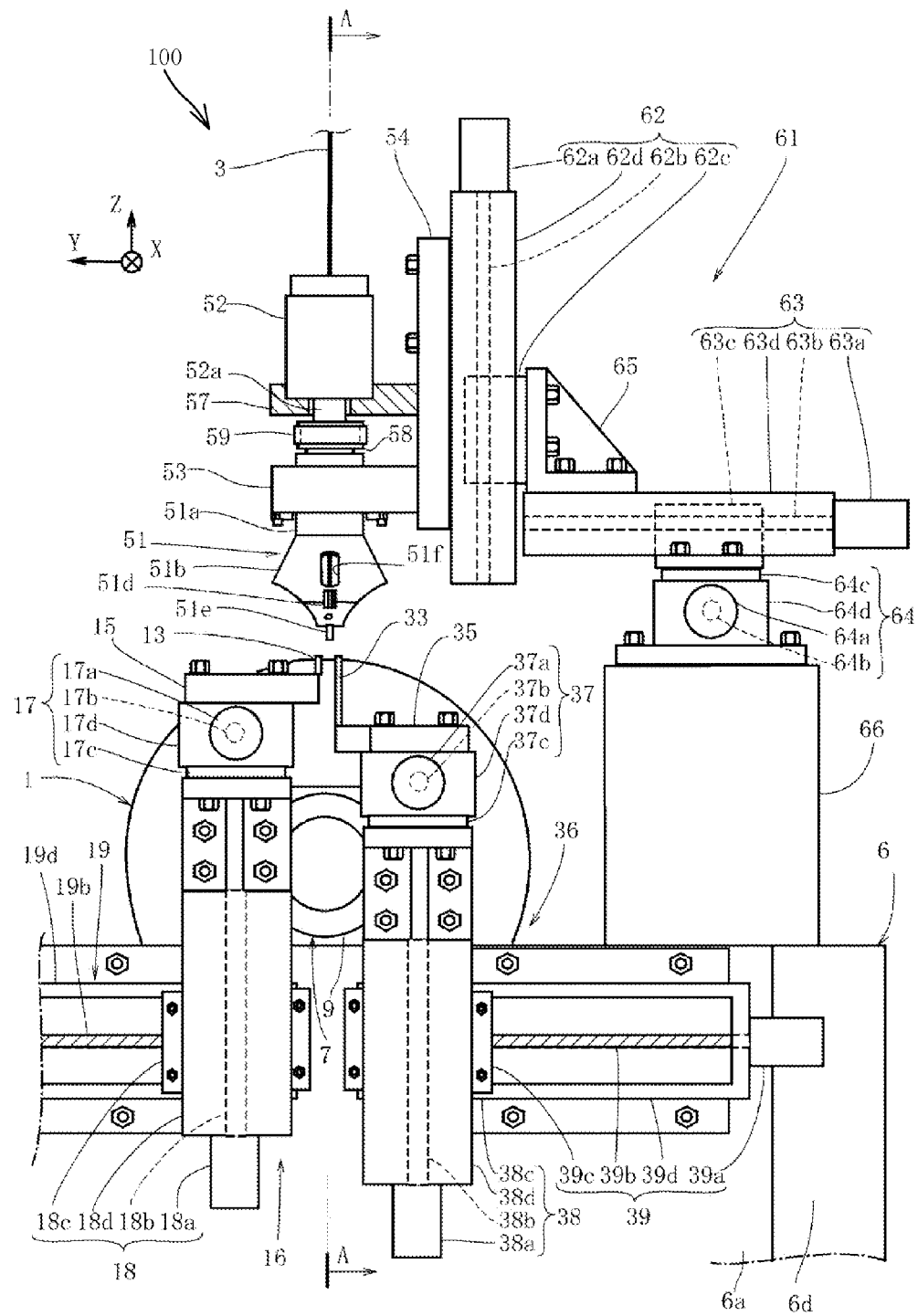
FIG. 3 is a right-hand side view of the winding apparatus according to the embodiment of the present invention.
Figure 8:
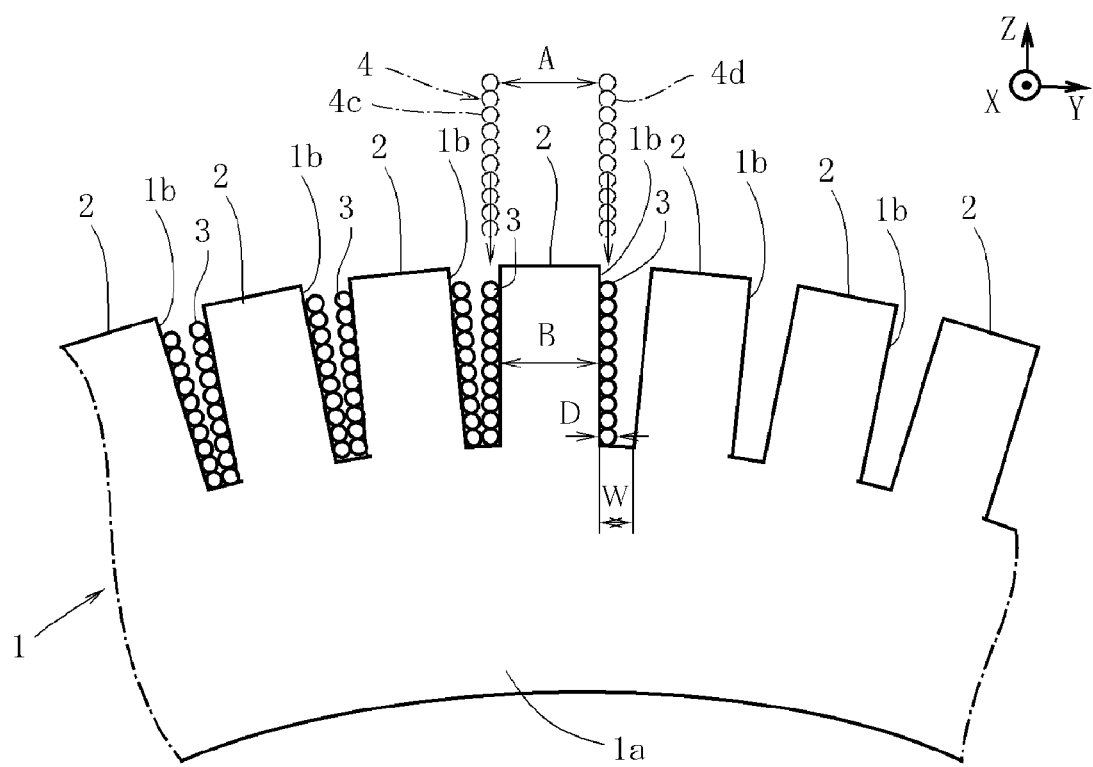
FIG. 8 is a cross-sectional view taken along the line D-D of FIG. 7, for illustrating a state in which the coil formed of the wound wire is inserted into slots.

FIGS. 1 to 3 illustrate a winding apparatus 100 according to an embodiment of the present invention. As illustrated in FIG. 1, the winding apparatus 100 is an apparatus that winds a wire 3 around a plurality of magnetic poles 2 of a multi-pole armature 1 forming a motor, a resolver, or a power generator. The multi-pole armature 1 is used in a resolver, and includes an annular portion 1a and the plurality of magnetic poles 2 projecting radially from the annular portion 1a toward a radial direction outer side. As illustrated in FIG. 8, straight slots 1b into which the wire 3 is inserted are provided as openings between the respective magnetic poles 2 of the multi-pole armature 1. A width W of the slot 1b, into which the wire 3 is to be inserted, is set to be slightly larger than a value twice an outer diameter D of the wire 3. Specifically, the width W is set to such a value that two layers of the wire 3 can be inserted into the slot 1b while overlapping in a widthwise direction of the slot 1b, but three layers of the wire 3 cannot be inserted into the slot 1b while overlapping in the widthwise direction of the slot 1b. The slot 1b is formed into a straight shape so as to be parallel to a center axis of the annular portion 1a. In other words, each magnetic pole 2 is formed to have a rectangular cross-section, and an outer peripheral surface of the magnetic pole 2 is constituted by four smooth planes.

Figure 4:
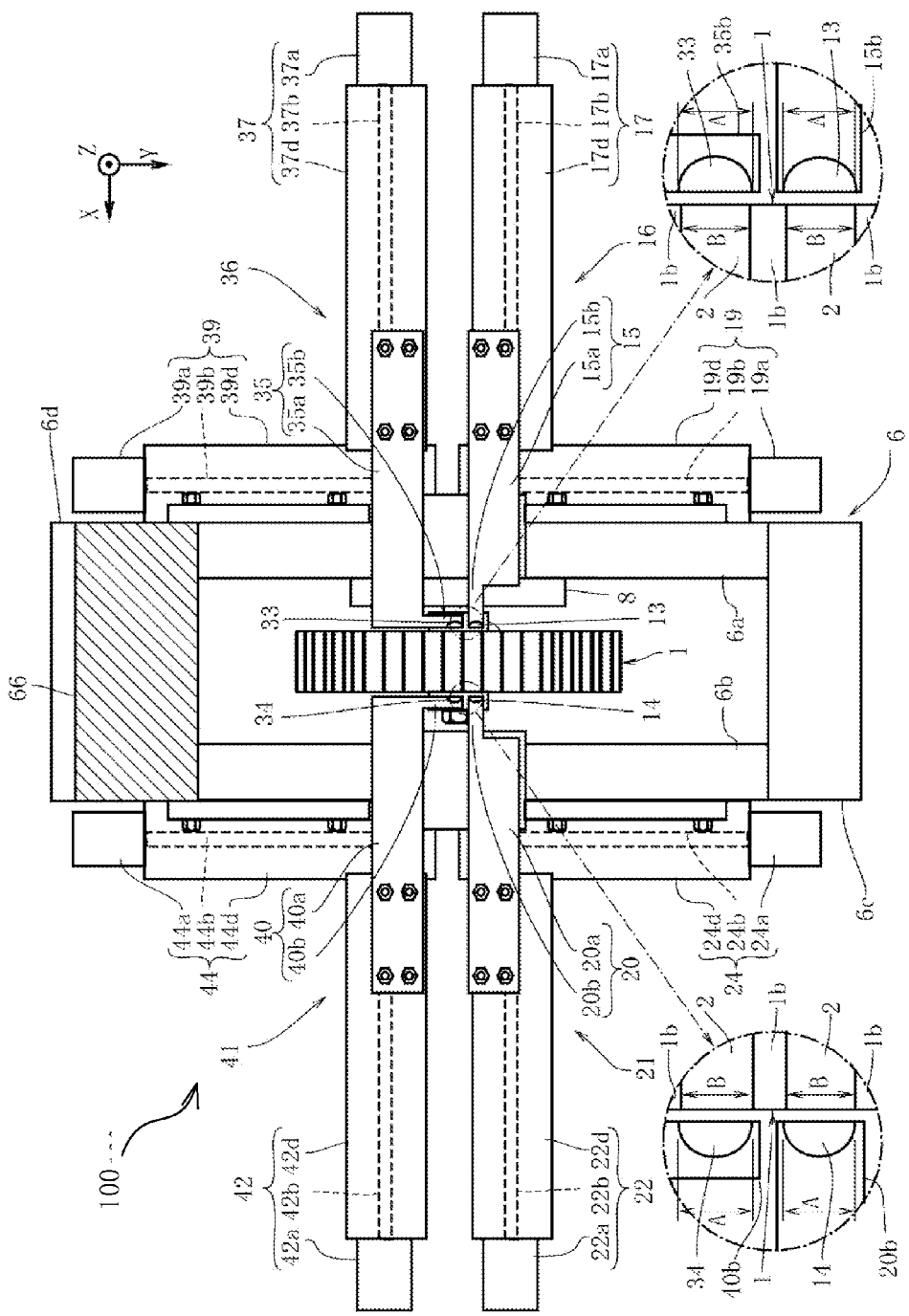
FIG. 4 is a cross-sectional view taken along the line B-B of FIG. 2.

As illustrated in FIGS. 1 to 3, the winding apparatus 100 includes a base 5 on which respective members are disposed, a support base 6 formed in a rectangular shape and attached on the base 5, and an index mechanism 7 that is attached on the support base 6 and rotates the multi-pole armature 1 in order to send the respective magnetic poles 2 sequentially to a winding position. As illustrated in FIG. 4, the support base 6 includes a pair of side plates 6a, 6b provided at an interval so as to sandwich the multi-pole armature 1, and end plates 6c, 6d connected to end portions of the pair of side plates 6a, 6b to be formed in a rectangular shape with the end plates 6a, 6b.

Three mutually orthogonal axes, namely an X axis, a Y axis, and a Z axis, are set in the figures, and the configuration of the winding apparatus 100 will be described below using these axes. The X axis corresponds to a substantially horizontal lateral direction serving as an axial direction of the multi-pole armature 1. The Y axis corresponds to a substantially horizontal front-rear direction serving as a radial direction of the multi-pole armature 1. The Z axis corresponds to a radial direction of the multi-pole armature 1 extending in a vertical direction in a position of the magnetic pole 2 on which a winding is to be formed.

Figure 5:
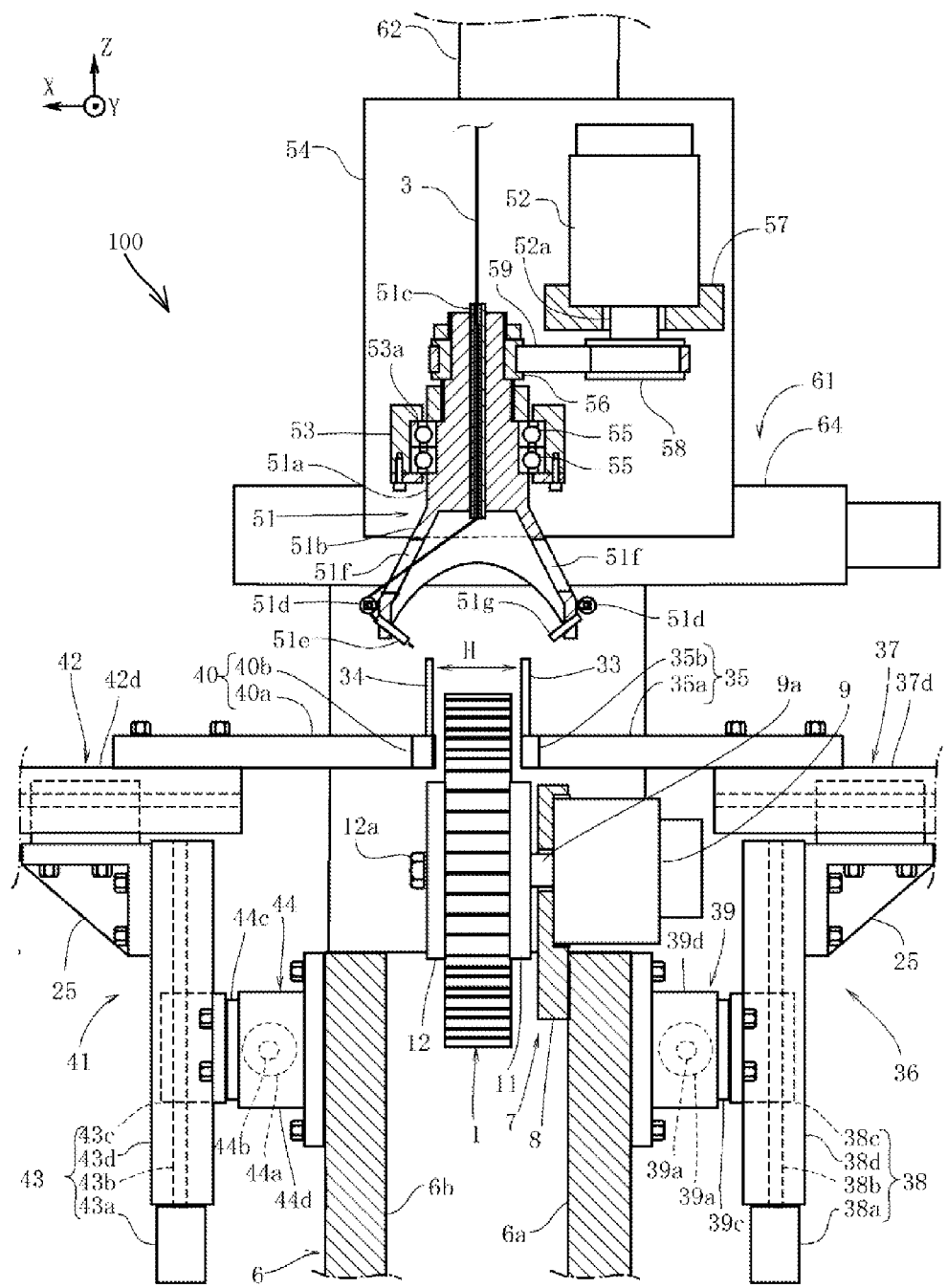
FIG. 5 is a cross-sectional view taken along the line A-A of FIG. 3.

As illustrated in FIG. 5, the index mechanism 7 supports the multi-pole armature 1 such that the axial direction of the multi-pole armature 1 extends horizontally. The index mechanism 7 includes an index motor 9 fixed to the support base 6 via an attachment plate 8, an index table 11 which is coupled to an output shaft 9a of the index motor 9 and to which the multi-pole armature 1 is attached, and an attachment tool 12 that is configured to be fixable to the index table 11 coaxially therewith, and that sandwiches the multi-pole armature 1 together with the index table 11. The annular portion 1a (see FIG. 1) of the multi-pole armature 1 is disposed coaxially with the index table 11. The multi-pole armature 1 thus disposed is sandwiched between the attachment tool 12 and the index table 11 via an attachment screw 12a so as to be supported coaxially with the horizontal output shaft 9a of the index motor 9.

In the index mechanism 7, the multi-pole armature 1 is supported coaxially with the horizontal output shaft 9a of the index motor 9, and therefore, when the index motor 9 is driven, the multi-pole armature 1 supported by the index table 11 rotates about the axis thereof. Here, the winding apparatus 100 performs winding around one magnetic pole 2 positioned at the top of the multi-pole armature 1 in the Z axis direction, while the multi-pole armature 1 is supported such that the central axis thereof is horizontal. The one of magnetic poles 2 positioned at the top of the multi-pole armature 1 and subjected to winding will be referred to hereafter as "the magnetic pole 2 in the winding position". When a winding operation onto the magnetic pole 2 in the winding position is complete, the multi-pole armature 1 is rotated by driving the index motor 9 to send the next magnetic pole 2 to be subjected to winding to the winding position at the top of the Z axis direction. Hence, the index mechanism 7 is configured to send the magnetic poles 2 of the multi-pole armature 1 sequentially to the winding position.

In the winding apparatus 100, the wire 3 wound into a ring shape is inserted into the slots 1b formed between the magnetic poles 2 so that the wire 3 is wound around the magnetic pole 2 of the multi-pole armature 1 in the winding position. This embodiment describes a case where the wire 3 wound into a ring shape is inserted into the slots 1b formed on both sides of the single magnetic pole 2.

The winding apparatus 100 includes a pair of first latch pawls 13, 14 provided with a distance therebetween so as to sandwich the magnetic pole 2 of the multi-pole armature 1, a flyer 51 for feeding the wire 3 while rotating around the pair of first latch pawls 13, 14 so as to loop and wind the wire 3 around the pair of first latch pawls 13, 14, and first moving mechanisms 16, 21 configured to move the pair of first latch pawls 13, 14 to a position of sandwiching the magnetic pole 2, to thereby insert the wire 3 wound around the pair of first latch pawls 13, 14 into the slots 1b between the magnetic poles 2 so that the wire 3 is wound around the magnetic pole 2.

The pair of first latch pawls 13, 14 is provided with a distance H (see FIG. 2) therebetween so as to sandwich the magnetic pole 2 from the X axis direction corresponding to the axial direction of the multi-pole armature 1. As illustrated in an enlarged view of FIG. 4, the pair of first latch pawls 13, 14 is formed so as to have a width dimension A in the Y axis direction equal to or slightly larger than a circumferential direction width B of the magnetic pole 2 in a state of sandwiching the magnetic pole 2. The pair of first latch pawls 13, 14 is formed into such a shape that a surface opposed to the magnetic pole 2 is formed into a flat surface and a surface opposite to the magnetic pole 2 is curved so that a center thereof swells outward in the X axis direction. In this manner, the pair of first latch pawls 13, 14 is formed into a rod-shaped member having a D-shaped cross-section.

As illustrated in FIG. 2, as a first moving mechanism for moving the pair of first latch pawls 13, 14, the winding apparatus 100 includes the right first moving mechanism 16 and the left first moving mechanism 21. The right first moving mechanism 16 is constituted by a combination of actuators 17, 19, and 18 that expand and contract in the X axis direction, the Y axis direction, and the Z axis direction, and is configured to move the first latch pawl 13 in the three axial directions. The left first moving mechanism 21 is constituted by a combination of actuators 22, 24, and 23 that expand and contract in the X axis direction, the Y axis direction, and the Z axis direction, and is configured to move the first latch pawl 14 in the three axial directions. The right first moving mechanism 16 and the left first moving mechanism 21 are formed symmetrically so as to have the same structure.

The respective expanding/contracting actuators 17 to 19 of the first moving mechanism 16 are constituted by are constituted by elongated box-shaped housings 17d to 19d, ball screws 17b to 19b that are provided to extend through the interiors of the housings 17d to 19d in a lengthwise direction and driven to rotate by servo motors 17a to 19a, followers 17c to 19c that are screwed to the ball screws 17b to 19c so as to perform a parallel movement, and so on. The expanding/contracting actuators 22 to 24 of the first moving mechanism 21 are constituted by elongated box-shaped housings 22d to 24d, ball screws 22b to 24b that are provided to extend through the interiors of the housings 22d to 24d in a lengthwise direction and driven to rotate by servo motors 22a to 24a, followers 22c to 24c hat are screwed to the ball screws 22b to 24c so as to perform a parallel movement, and so on. The expanding/contracting actuators 17 to 19 are configured such that when the ball screws 17b to 19b are rotated by driving the servo motors 17a to 19a, the followers 17c to 19c screwed to the ball screws 17b to 19b can move in the lengthwise direction of the housings 17d to 19d. The expanding/contracting actuators 22 to 24 are configured such that when the ball screws 22b to 24b are rotated by driving the servo motors 22a to 24a, the followers 22c to 24c screwed to the ball screws 22b to 24b can move in the lengthwise direction of the housings 22d to 24d.

The pair of first latch pawls 13, 14 is attached to the first moving mechanisms 16, 21 via a first moving plates 15, 20, respectively. Specifically, the first moving plate 15 on which the first latch pawl 13 is provided is attached to the housing 17d of the X axis direction expanding/contracting actuator 17 to be capable of moving in the X axis direction. The first moving plate 20 on which the first latch pawl 14 is provided is attached to the housing 22d of the X axis direction expanding/contracting actuator 22 to be capable of moving in the X axis direction. The follower 17c is attached to the housing 18d of the Z axis direction expanding/contracting actuator 18 via an L-shaped bracket 25 to be capable of moving the first moving plate 15 in the Z axis direction together with the X axis direction expanding/contracting actuator 17. The follower 22c is attached to the housing 23d of the Z axis direction expanding/contracting actuator 23 via the L-shaped bracket 25 to be capable of moving the first moving plate 20 in the Z axis direction together with the X axis direction expanding/contracting actuator 22. Further, the follower 18c of the Z axis direction expanding/contracting actuator 18 is attached to the follower 19c of the Y axis direction expanding/contracting actuator 19 to be capable of moving the first moving plate 15 in the Y axis direction together with the X axis direction expanding/contracting actuator 17 and the Z axis direction expanding/contracting actuator 18. The follower 23c of the Z axis direction expanding/contracting actuator 23 is attached to the follower 24c of the Y axis direction expanding/contracting actuator 24 to be capable of moving the first moving plate 20 in the Y axis direction together with the X axis direction expanding/contracting actuator 22 and the Z axis direction expanding/contracting actuator 23. The housing 19d of the Y axis direction expanding/contracting actuator 19 is attached to the side plate 6a of the support base 6. The housing 24d of the Y axis direction expanding/contracting actuator 24 is attached to the side plate 6b of the support base 6. The X axis servo motors 17a, 22a, the Y axis servo motors 19a, 24a, and the Z axis servo motors 18a, 23a of the respective expanding/contracting actuators 17 to 19, 22 to 24 are connected to a control output of a controller (not shown) that controls the servo motors.

As illustrated in FIGS. 3 to 5, the winding apparatus 100 further includes a pair of second latch pawls 33, 34 provided with a distance therebetween at a position next to the pair of first latch pawls 13, 14 so as to sandwich the magnetic pole 2, and second moving mechanisms 36, 41 for moving the pair of second latch pawls 33, 34, respectively. The pair of second latch pawls 33, 34 is formed so as to have the same cross-sectional shape as that of the pair of first latch pawls 13, 14. In other words, as illustrated in FIG. 4, the pair of second latch pawls 33, 34 is also formed into a rod-shaped member having a D-shaped cross-section. The pair of second latch pawls 33, 34 is formed so as to have the width dimension A in the Y axis direction equal to or slightly larger than the circumferential direction width B of the magnetic pole 2 in a state of sandwiching the magnetic pole 2. As illustrated in FIG. 3, unlike the pair of first latch pawls 13, 14, the pair of second latch pawls 33, 34 is formed so as to have a length in the Z axis direction larger than that of the pair of first latch pawls 13, 14.

An identically structured mechanism to the first moving mechanism 16,21 described above is used as the second moving mechanisms 36, 41. As illustrated in FIG. 5, the right second moving mechanism 36 is constituted by a combination of an actuator 37, 39, and a38, that expand and contract in the X axis direction, the Y axis direction, and the Z axis direction, and is configured to move the second latch pawl 33 in the three axial directions. The left second moving mechanism 41 is constituted by a combination of an actuator 42, 44, and 43, that expand and contract in the X axis direction, the Y axis direction, and the Z axis direction, and is configured to move the second latch pawl 34 in the three axial directions. The pair of second latch pawls 33, 34 is respectively attached via second moving plates 35, 40 to housings 37d, 42d of the X axis direction expanding/contracting actuators 37, 42 forming the second moving mechanisms 36, 41. The right second moving mechanism 36 and the left second moving mechanism 41 are formed symmetrically so as to have the same structure. Further, the right second moving mechanism 36 and the left second moving mechanism 41 have the same structure as those of the right first moving mechanism 16 and the left first moving mechanism 21 described above. Accordingly, repeated description thereof is omitted.

As described above, the first moving mechanisms 16, 21 illustrated in FIG. 2 and the second moving mechanisms 36, 41 illustrated in FIG. 5 are configured to arbitrarily move, in response to a command of the controller (not shown), the pair of first latch pawls 13, 14 and the pair of second latch pawls 33, 34 with respect to the base 5 in the three axial directions together with the first moving plates 15, 20 and the second moving plates 35, 40. Specifically, the first moving mechanisms 16, 21 at least move the pair of first latch pawls 13, 14 in the three axial directions from a position at which the wire 3 is to be wound around the pair of first latch pawls 13, 14 by the flyer 51 described below to a position at which the pair of first latch pawls 13, 14 sandwiches the magnetic pole 2. The first moving mechanisms 16, 21 moves the pair of first latch pawls 13, 14 in this manner, and thus the wire 3 wound around the pair of first latch pawls 13, 14 is inserted into the slots 1b (see FIGS. 9 and 10). Further, the second moving mechanisms 36, 41 at least move the pair of second latch pawls 33, 34 in the three axial directions from a position at which the wire 3 is to be wound around the pair of second latch pawls 33, 34 by the flyer 51 described below, to a position at which the pair of second latch pawls 33, 34 sandwiches the magnetic pole 2. The second moving mechanisms 36, 41 move the pair of second latch pawls 33, 34 in this manner, and thus the wire 3 wound around the pair of second latch pawls 33, 34 is inserted into the slots 1b (see FIGS. 12 and 13).

As illustrated in FIG. 4, the first moving plates 15, 20 to which the pair of first latch pawls 13, 14 is attached and the second moving plates 35, 40 to which the pair of second latch pawls 33, 34 is attached differ in shape. The first moving plates 15, 20 respectively include main plates 15a, 20a that are mounted at proximal ends thereof to the housings 17d, 22d of the X axis direction expanding/contracting actuators 17, 22 of the respective moving mechanisms 16, 21. The second moving plates 35, 40 respectively include main plates 35a, 40a that are attached at proximal ends thereof to the housings 37d, 42d of the X axis direction expanding/contracting actuators 37, 42 of the respective moving mechanisms 36, 41. The first moving plates 15, 20 respectively include extension portions 15b, 20b extending from distal ends of the main plates 15a, 20a in the X axis direction toward the multi-pole armature 1. The pair of first latch pawls 13, 14 is respectively attached to the distal ends of the extension portions 15b, 20b so as to extend in the Z axis direction. In contrast, the second moving plates 35, 40 respectively include orthogonal portions 35b, 40b extending from distal ends of the main plates 35a, 40a in the Y axis direction toward a circumferential direction of the multi-pole armature 1. The pair of second latch pawls 33, 34 is respectively attached to the distal ends of the orthogonal portions 35*b*, 40*b* so as to extend in the Z axis direction.

As illustrated in FIGS. 1 to 3, the winding apparatus 100 includes the flyer 51 for feeding the wire 3 while rotating around the pair of first latch pawls 13, 14 or around the pair of second latch pawls 33, 34 so as to loop and wind the wire 3 around the pair of first latch pawls 13, 14 or the pair of second latch pawls 33, 34. The flyer 51 is opposed, from the top, to the magnetic pole 2 in the winding position, specifically, the magnetic pole 2 located at the upper position in the Z axis direction on the multi-pole armature 1 supported while keeping the center axis thereof in a horizontal direction. Under this state, the flyer 51 is rotated by a driving motor 52 about a vertical axis around the pair of first latch pawls 13, 14 or around the pair of second latch pawls 33, 34, and feeds the wire 3. In this manner, the flyer 51 loops and winds the wire 3 around the pair of first latch pawls 13, 14 or the pair of second latch pawls 33, 34.

Specifically, as illustrated in FIG. 5 in detail, the flyer 51 includes a shaft portion 51*a* pivotably supported by a support portion 53, and a flyer portion 51*b* that is connected at a proximal end thereof to a lower end portion of the shaft portion 51*a* facing the multi-pole armature 1, and has a trumpet-shape gradually increased in diameter toward the multi-pole armature 1. At the flaring lower end of the flyer portion 51*b*, a pair of small pulleys 51*d* is provided on an outer side of the flyer portion 51*b*. The pair of small pulleys 51*d* is arranged at symmetrical positions with respect to a rotation axis of the shaft portion 51*a*, and configured to turn the wire 3. At the vicinity of one of the small pulleys 51*d*, a nozzle 51*e* is provided obliquely so as to guide, toward the magnetic pole 2 in the winding position, the wire 3 turned by the one of the small pulleys 51*d*. At the vicinity of another one of the small pulleys 51*d*, a dummy nozzle 51*g* having the same shape and the same size as those of the nozzle 51*e* is provided obliquely in a similar way at a position symmetrical with the nozzle 51*e* with respect to the rotation axis. As described above, the flyer 51 is formed so that a cross-section containing the rotation axis of the flyer 51 exhibits structure symmetrical with respect to the rotation axis.

The support portion 53 is provided upright on a vertical plate 54 that is parallel to the end plates 6*c*, 6*d* of the support base 6. The shaft portion 51*a* is provided so as to pass through a support hole 53*a* of the support portion 53 so that, in the Z axis direction, the center axis of the shaft portion 51*a* of the flyer 51 is located above the magnetic pole 2 in the winding position. The flyer 51 is supported on the support portion 53 via bearings 55 so as to freely rotate about the center axis of the shaft portion 51*a*. A guide tube 51*c* is fixed in the shaft portion 51*a* so as to pass through the center axis of the shaft portion 51*a*. The wire 3 fed from a source of the wire (not shown) is introduced in the guide tube 51*c*, and the guide tube 51*c* is configured to feed, toward one of the small pulleys 51*d*, the wire 3 from a distal end of the guide tube 51*c* facing the magnetic pole 2 in the winding position. A passage hole 51*f* for allowing the wire 3 to pass therethrough is formed in the flyer portion 51*b* for coupling the distal end of the guide tube 51*c* and one of the small pulleys 51*d* to each other. After passing through the passage hole 51*f*, the wire 3 fed from the distal end of the guide tube 51*c* is turned at one of the small pulleys 51*d*, and then can be supplied through the nozzle 51*e* around the pair of first latch pawls 13, 14 or around the pair of second latch pawls 33, 34.

A first pulley 56 having a center axis aligned with the center axis of the shaft portion 51*a* is attached on a proximal end of the shaft portion 51*a*. Further, the driving motor 52 including a rotation shaft 52*a* parallel to the center axes is provided at a position adjacent to the flyer 51. The driving motor 52 is attached to a stationary plate 57 provided upright on the vertical plate 54, and a second pulley 58 is attached to the rotation shaft 52*a*. A belt 59 is looped around the first pulley 56 and the second pulley 58. The control output of the controller (not shown) is connected to the driving motor 52. The driving motor 52 is driven in response to the command of the controller, and thus the rotation shaft 52*a* is rotated together with the second pulley 58. Rotation of the second pulley 58 is transmitted to the first pulley 56 through the belt 59, to thereby rotate the flyer 51 on which the first pulley 56 is provided.

As illustrated in FIG. 3, the flyer 51 is attached to the support base 6 via flyer moving means 61 in a movable manner. The flyer moving means 61 has the identical structure as those of the above-mentioned moving mechanisms 16, 21, 36, 41 of various types, and is constituted by a combination of an X axis direction expanding/contracting actuator 64, a Y axis direction expanding/contracting actuator 63, and a Z axis direction expanding/contracting actuator 62. Specifically, the vertical plate 54 on which the flyer 51 is provided is attached to a housing 62*d* of the Z axis direction expanding/contracting actuator 62 so as to be capable of moving in the Z axis direction. A follower 62*c* is attached to a housing 63*d* of the Y axis direction expanding/contracting actuator 63 via an L-shaped bracket 65 so as to be capable of moving the vertical plate 54 in the Y axis direction together with the Z axis direction expanding/contracting actuator 62. Further, a follower 63*c* of the Y axis direction expanding/contracting actuator 63 is attached to a follower 64*c* of the X axis direction expanding/contracting actuator 64. In addition, a housing 64*d* of the X axis direction expanding/contracting actuator 64 is attached to the support base 6 via a pedestal 66 so as to be capable of moving the vertical plate 54 in the X axis direction together with the Y axis direction expanding/contracting actuator 63 and the Z axis direction expanding/contracting actuator 62. A Z axis servo motor 62*a*, a Y axis servo motor 63*a*, and an X axis servo motor 64*a* of the respective expanding/contracting actuators 62 to 64 are connected to the control output of the controller (not shown) for controlling the servo motors. The flyer moving means 61 is configured to drive the respective expanding/contracting actuators 62 to 64 in response to the command of the controller, to thereby enable the flyer 51 to move arbitrarily in the three axial directions with respect to the base 5 together with the vertical plate 54.

Next, a winding method according to this embodiment using the above-mentioned winding apparatus is described.

Figure 9:
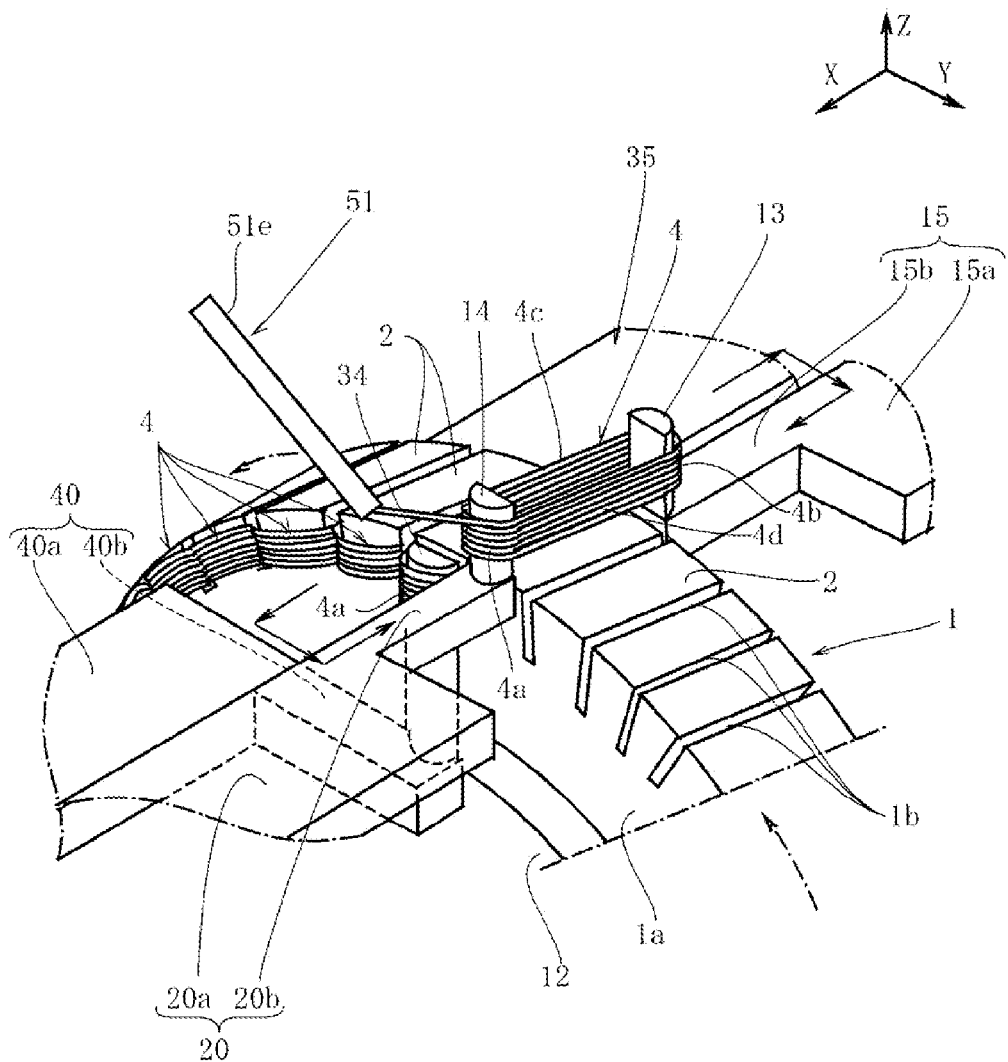
FIG. 9 is a perspective view illustrating a state in which the wire is wound around a pair of first latch pawls.
Figure 10:
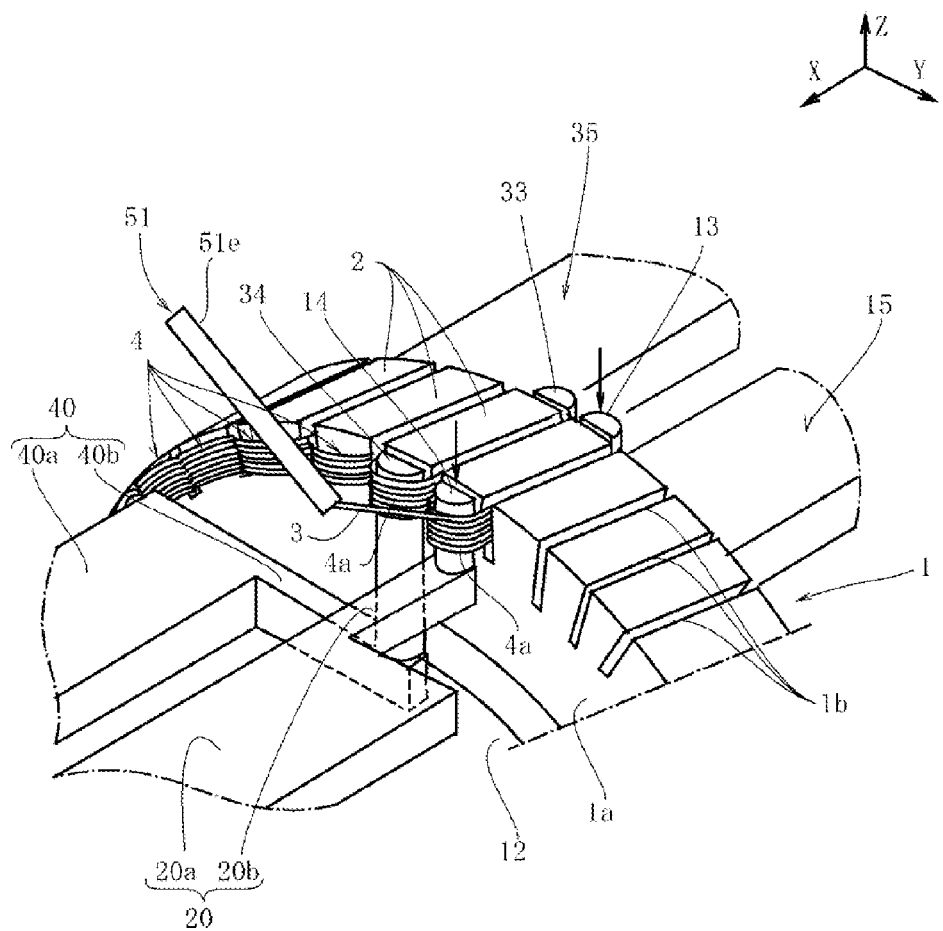
FIG. 10 is a perspective view illustrating a state in which the wire wound around the pair of first latch pawls is inserted into the slots.

In the winding method according to this embodiment, a first indexing step of sending each of the magnetic poles 2 to the winding position by rotating of the multi-pole armature 1, a first winding step of, as illustrated in FIG. 9, looping and winding the wire 3 around the pair of first latch pawls 13, 14 at an outer side of the multi-pole armature 1, and a first fitting step of, as illustrated in FIG. 10, moving the pair of first latch pawls 13, 14 so as to fit the wire wound around the pair of first latch pawls 13, 14 onto the magnetic pole 2 in the winding position, are performed repeatedly.

Figure 12:
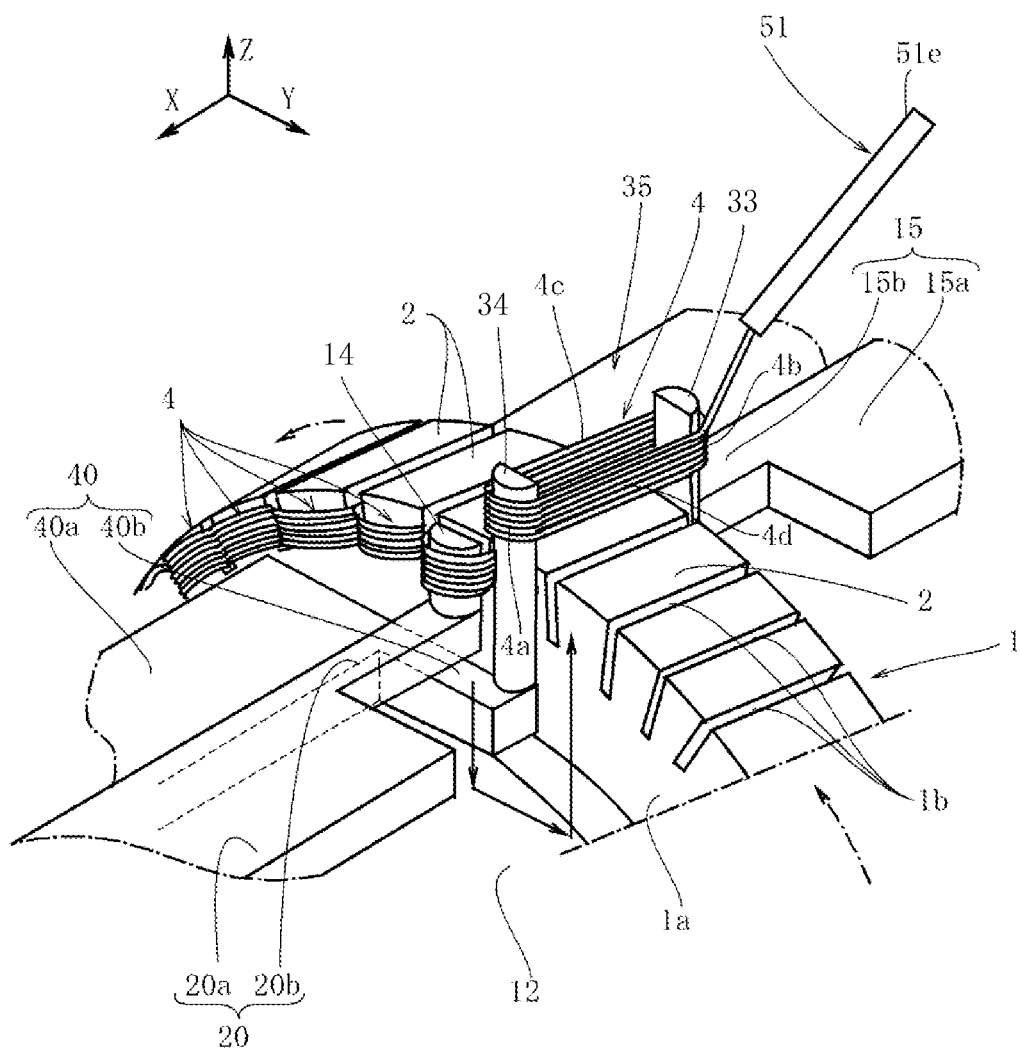
FIG. 12 is a perspective view illustrating a state in which the wire is wound around the pair of second latch pawls.
Figure 13:
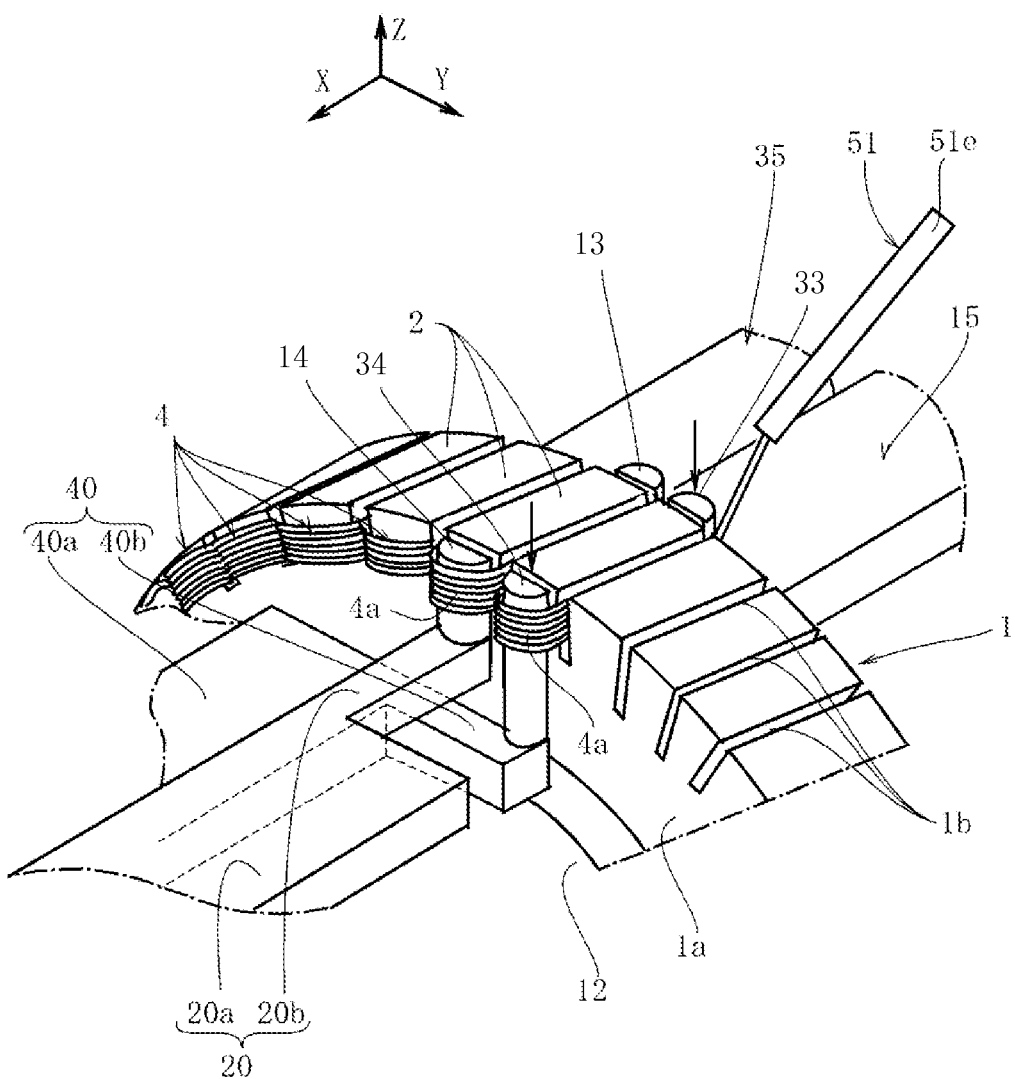
FIG. 13 is a perspective view illustrating a state in which the wire wound around the pair of second latch pawls is inserted into the slots.

Further, the winding method may further include a second indexing step of sending another magnetic pole 2 to the winding position by rotating of the multi-pole armature 1 after the first fitting step or concurrently with the first fitting step, a second winding step of, as illustrated in FIG. 12, looping and winding the wire 3 around the pair of second latch pawls 33, 34 at the outer side of the multi-pole armature 1, and a second fitting step of, as illustrated in FIG. 13, moving the pair of second latch pawls 33, 34 so as to fit the wire wound around the pair of second latch pawls 33, 34 onto the magnetic pole 2 in the winding position. In this case, the first indexing step is performed after the second fitting step or concurrently with the second fitting step. In addition, in the first winding step and the first fitting step, the pair of second latch pawls 33, 34 can be kept at a position of sandwiching, from both sides of the multi-pole armature 1 in the axial direction, the magnetic pole 2 having the wire fitted thereonto in the second fitting step. In the second winding step and the second fitting step, the pair of first latch pawls 13, 14 can be kept at a position of sandwiching, from the both sides of the multi-pole armature 1 in the axial direction, the magnetic pole 2 having the wire fitted thereonto in the first fitting step. The respective steps are described below in detail, and operations of the winding apparatus 100 during the respective steps are automatically controlled by the controller (not shown) installed in the winding apparatus 100.

First, for preparation before performing winding, the multi-pole armature 1 is supported by the indexing mechanism 7. Specifically, as illustrated in FIG. 5, the multi-pole armature 1 is sandwiched between the attachment tool 12 and the index table 11 by disposing the annular portion 1a of the multi-pole armature 1 coaxially with the index table 11 and attaching the attachment tool 12 to the index table 11 via the attachment screw 12a. As a result, the multi-pole armature 1 is supported by the horizontal output shaft 9a of the index motor 9 coaxially therewith.

After that, the first indexing step is performed. In the first indexing step, the supported multi-pole armature 1 is rotated by driving the index motor 9 of the index mechanism 7, whereby the magnetic pole 2 to be subjected to winding is moved to the winding position at the top of the Z axis direction. Specifically, the magnetic pole 2 that is to be subjected to winding is located at the upper position in the Z axis direction so as to be aligned with a rotation axis direction of the flyer 51. Although not shown, positions of the magnetic poles 2 are detected using a detector such as a sensor provided in the vicinity of the magnetic poles 2, and the magnetic poles 2 are positioned in the winding position of the multi-pole armature 1 on the basis of detected information. When the wire is to be wound for the first time, the flyer 51 is moved by the flyer moving means 61, and the nozzle 51e to which the wire 3 is supplied is moved around a tying pin (not shown) of the multi-pole armature 1. In this manner, the wire 3 fed from the nozzle 51e is tied to the tying pin.

Figure 6:
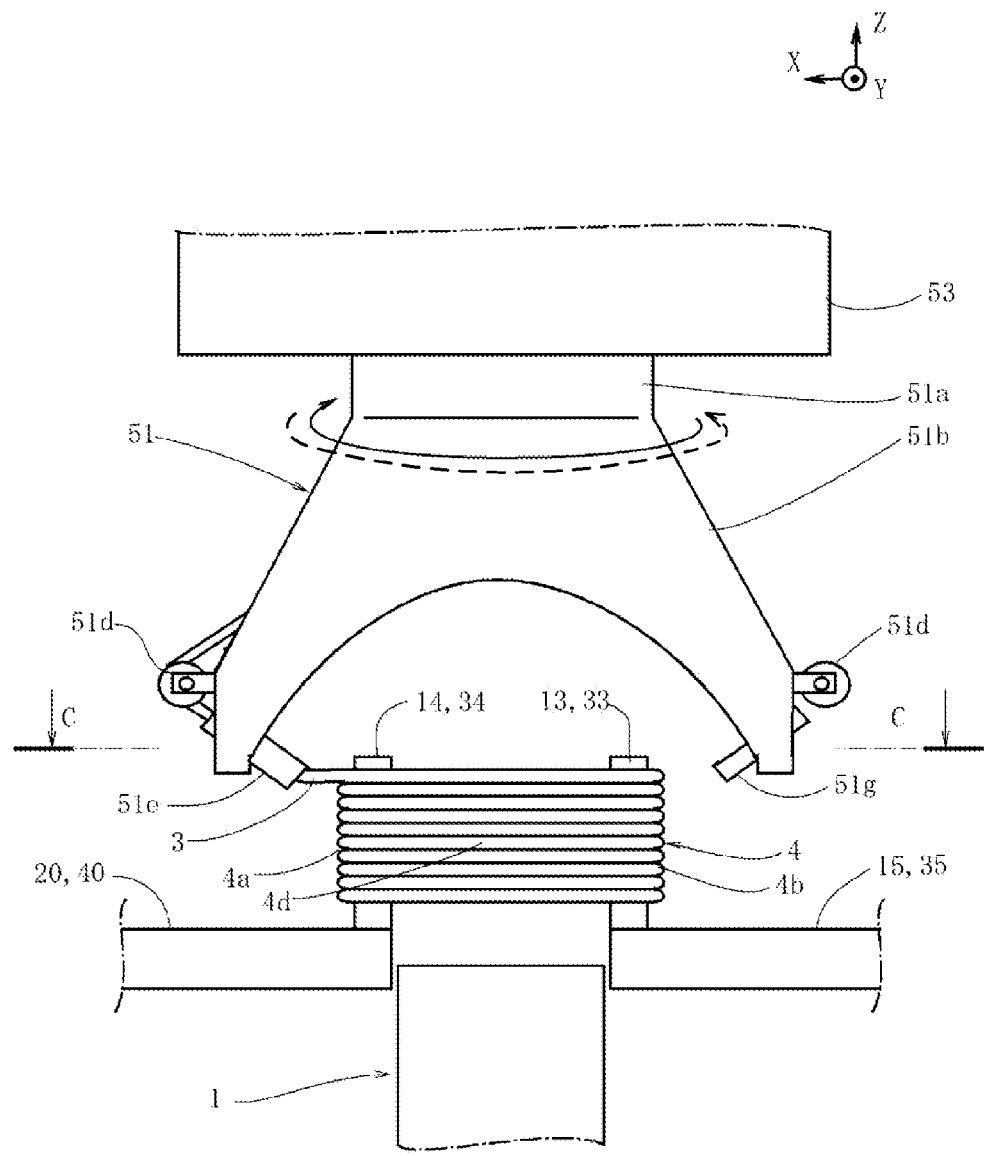
FIG. 6 is a front view illustrating a state in which a wire is wound around a pair of latch pawls.

Next, the first winding step is started. In the first winding step, first, as illustrated in FIGS. 6 and 9, the pair of first latch pawls 13, 14 is moved by the first moving mechanisms 16, 21, respectively. The pair of first latch pawls 13, 14 is arranged with the distance H (see FIG. 7) therebetween so as to sandwich the magnetic pole 2 in the winding position with a slight gap in the axial direction of the multi-pole armature 1. The pair of first latch pawls 13, 14 is moved by the first moving mechanisms 16, 21 to the outer side of the multi-pole armature 1, specifically, to the upper position in the Z axis direction. Then, the flyer 51 is rotated by the driving motor 52 as indicated by the solid arrow of FIG. 6. In this manner, the wire 3 fed from the nozzle 51e of the flyer 51 is looped and wound around the pair of first latch pawls 13, 14 at the outer side of the multi-pole armature 1.

The width W (FIG. 8) of the slot 1b, into which the wire 3 is to be inserted, is set to disable three layers of the wire 3 to be inserted into the slot 1b while overlapping in the widthwise direction of the slot 1b. Accordingly, in the first winding step, every time the flyer 51 performs one revolution, the flyer moving means 61 moves the flyer 51 in the Z axis direction by an amount corresponding to a diameter D of the wire 3. In this manner, the wire 3 is wound around the pair of first latch pawls 13, 14 so that the wound wire 3 is arranged in the Z axis direction with no gap, and thus the wire 3 is prevented from overlapping in the radial direction, specifically, overlapping in the X axis direction or the Y axis direction.

Figure 7:
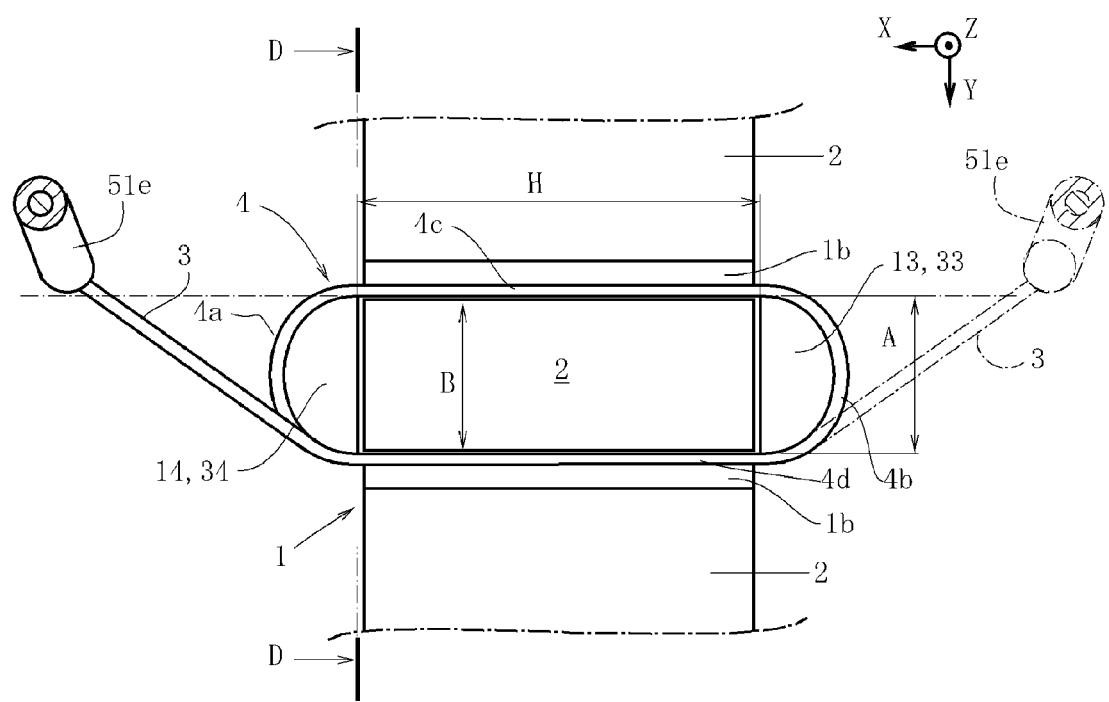
FIG. 7 is a cross-sectional view taken along the line C-C of FIG. 6, for illustrating a coil formed of the wire wound around the pair of latch pawls.

When the wire 3 is looped and wound around the pair of first latch pawls 13, 14 that is arranged with the distance H therebetween so as to sandwich the magnetic pole 2 with the slight gap in the axial direction, a coil 4 as illustrated in FIG. 7 is formed. The coil 4 formed of the wound wire 3 includes circular arc portions 4a, 4b that are respectively looped over the first latch pawls 14, 13, and a pair of parallel elongate portions 4c, 4d elongating straight and continuously with both end portions of the circular arc portions 4a, 4b between the pair of first locking claws 13, 14. Further, as illustrated in FIG. 7, the pair of first latch pawls 13, 14 sandwiching the magnetic pole 2 is formed so as to have the width dimension A in the Y axis direction equal to or slightly larger than the circumferential direction width B of the magnetic pole 2. Accordingly, as illustrated in FIG. 8, the parallel elongate portions 4c, 4d of the coil 4 formed of the wound wire 3 are arranged with a distance A therebetween, which is equal to or slightly larger than the circumferential direction width B of the magnetic pole 2.

Next, the first fitting step is performed. In the first fitting step, the pair of first latch pawls 13, 14 is moved downward in the Z axis direction so that the wire 3 wound around the pair of first latch pawls 13, 14 is fitted onto the magnetic pole 2 in the winding position. Specifically, as illustrated in FIGS. 8 and 10, together with the coil 4 formed of the wound wire 3, the pair of first latch pawls 13, 14 is moved by the first moving mechanisms 16, 21 (see FIG. 2) to a position of sandwiching the magnetic pole 2 in the winding position from the outer side of the multi-pole armature 1. Then, as indicated by the solid arrow of FIG. 8, the parallel elongate portions 4c, 4d of the coil 4 formed with at least the circumferential direction width B of the magnetic pole 2 are respectively inserted into the slots 1b on both sides of the magnetic pole 2 in the winding position. In this manner, without deforming the coil 4 formed of the wound wire 3, the coil 4 can be fitted around the magnetic pole 2 in the winding position. As described above, in this embodiment, the coil 4 is not deformed when fitting the coil 4. Accordingly, unlike the related-art inserter method, in which the wire wound into a ring shape is deformed into an elongate shape, there is no fear in that the wire 3 is stretched.

Further, the parallel elongate portions 4c, 4d of the coil 4 are arranged with at least the circumferential direction width B of the magnetic pole 2, and the elongate portions 4c, 4d are moved in the radial direction of the multi-pole armature 1 and inserted into the slots 1b with the width B. Accordingly, the wire 3 is not rubbed against the slots 1b and the magnetic pole 2 excessively, and the wire 3 is not damaged. In the above-mentioned first winding step, the wire 3 is wound around the pair of first latch pawls 13, 14 while being adjacent to each other in the Z axis direction. Therefore, according to this embodiment, even when the width W (see FIG. 8) of the slot 1b into which the wire 3 is to be inserted is narrow, in the first fitting step, the coil 4 formed of a plurality of layers of the wound wire 3 can be inserted into the slots 1*b* without overlapping in the widthwise direction of the slots 1*b*.

Next, the second indexing step is performed. The second indexing step is performed after the above-mentioned first fitting step or concurrently with the first fitting step. In the second indexing step, the multi-pole armature 1 is rotated, and thus another magnetic pole 2 is sent to the winding position. Specifically, the supported multi-pole armature 1 is rotated by driving the index motor 9 of the index mechanism 7, whereby the magnetic pole 2 to be subsequently subjected to winding is moved to the winding position at the top of the Z axis direction. In this embodiment, the wire 3 is wound around the single magnetic pole 2, and hence the magnetic pole 2, which is adjacent to the magnetic pole 2 having the coil 4 fitted thereonto in the previous first fitting step, is guided to the winding position. The magnetic pole 2 having the coil 4 fitted thereonto is moved as indicated by the dashed-dotted arrow of FIG. 12.

In a case where the second indexing step is performed concurrently with the first fitting step, in the first fitting step, the first moving mechanisms 16, 21 move the pair of first latch pawls 13, 14 from the outer side of the multi-pole armature 1 to the position of sandwiching the magnetic pole 2 in the winding position, and also move the pair of first latch pawls 13, 14 together with the magnetic pole 2 moving in the circumferential direction. This prevents a fluctuation of a relative positional relationship in the circumferential direction between the pair of first latch pawls 13, 14 and the magnetic pole 2. In the second indexing step thus performed, another magnetic pole 2 reaches the winding position, and then the second winding step is performed. At the time of the second winding step and the subsequent second fitting step, the pair of first latch pawls 13, 14 is kept at a position of fitting the coil 4 onto the magnetic pole 2 and sandwiching the magnetic pole 2 from the both sides of the multi-pole armature 1 in the axial direction.

In the second winding step, the wire 3 is looped and wound around the pair of second latch pawls 33, 34 at the outer side of the multi-pole armature 1. In the second winding step, first, as illustrated in FIGS. 7 and 12, the pair of second latch pawls 33, 34 is moved by the second moving mechanisms 36, 41 (see FIG. 5), respectively. The pair of second latch pawls 33, 34 is arranged with a distance therebetween so as to sandwich, with a slight gap in the axial direction of the multi-pole armature 1, the magnetic pole 2 in the winding position, specifically, the magnetic pole 2 that is located at a position next to the magnetic pole 2 having the coil 4 fitted in the previous first fitting step and is subsequently located at the upper position of the multi-pole armature 1 in the Z axis direction in the second indexing step. At this time, as indicated by the solid arrows of FIG. 12, the second moving mechanisms 36, 41 move the pair of second latch pawls 33, 34 in the Z axis direction. In this manner, the second moving mechanisms 36, 41 move the pair of second latch pawls 33, 34 while avoiding a situation that the pair of second latch pawls 33, 34 collides with the extension portions 15*b*, 20*b* of the moving plates 15, 20 having the pair of first latch pawls 13, 14 attached thereon. While avoiding such a collision, the second moving mechanisms 36, 41 arrange the pair of second latch pawls 33, 34 with a distance therebetween so that the pair of second latch pawls 33, 34 sandwich the magnetic pole 2 in the winding position with a slight gap in the axial direction of the multi-pole armature 1.

The pair of second latch pawls 33, 34 is moved by the second moving mechanisms 36, 41 (see FIG. 5) to the outer side of the multi-pole armature 1, specifically, to the upper position in the Z axis direction, respectively. Then, the flyer 51 is rotated by the driving motor 52, and the wire 3 fed from the nozzle 51*e* is looped and wound around the pair of second latch pawls 33, 34 at the outer side of the multi-pole armature 1. As indicated by the dashed arrow of FIG. 6, a rotation direction of the flyer 51 in the second winding step is reverse to the rotation direction of the flyer 51 in the above-mentioned first winding step. Further, FIG. 7 illustrates the nozzle 51*e* of the flyer 51 in the second winding step by the dashed-dotted line. Also in the second winding step, every time the flyer 51 performs one revolution, the flyer moving means 61 moves the flyer 51 in the Z axis direction by an amount corresponding to the diameter D of the wire 3. In this manner, the wire 3 is wound around the pair of second latch pawls 33, 34 while being adjacent to each other in the Z axis direction, and thus the wire 3 is prevented from overlapping in the radial direction, specifically, overlapping in the X axis direction or the Y axis direction.

Next, the second fitting step is performed. In the second fitting step, the pair of second latch pawls 33, 34 is moved so that the wire wound around the pair of second latch pawls 33, 34 is fitted onto the magnetic pole 2 in the winding position. In this case, when the wire is looped and wound around the pair of second latch pawls 33, 34 that is arranged with a distance therebetween so as to sandwich the magnetic pole 2 with the slight gap in the axial direction, the coil 4 as illustrated in FIG. 7 is formed. The coil 4 thus formed also includes the circular arc portions 4*a*, 4*b* that are respectively looped over the pair of second latch pawls 33, 34, and the pair of parallel elongate portions 4*c*, 4*d* elongating straight and continuously with the both end portions of the circular arc portions 4*a*, 4*b* between the pair of second latch pawls 33, 34. Further, the pair of second latch pawls 33, 34 sandwiching the magnetic pole 2 is formed so as to have the width dimension A in the Y axis direction equal to or slightly larger than the circumferential direction width B of the magnetic pole 2. Accordingly, the parallel elongate portions 4*c*, 4*d* of the coil 4 formed of the wound wire 3 are arranged with a distance therebetween, which is equal to or slightly larger than the circumferential direction width B of the magnetic pole 2.

As illustrated in FIG. 13, in the second fitting step, when the pair of second latch pawls 33, 34 is moved together with the coil 4 to the position of sandwiching the magnetic pole 2 in the winding position from the outer side of the multi-pole armature 1, the elongate portions 4*c*, 4*d* of the coil 4 are respectively inserted into the slots 1*b* on the both sides of the magnetic pole 2 in the winding position as indicated by the solid arrows of FIG. 8. In this manner, also in the second fitting step, without deforming the coil 4 formed of the wire 3 wound around the magnetic pole 2 in the winding position, the coil 4 can be fitted around the magnetic pole 2. As described above, the coil 4 is not deformed when fitting the coil 4 in the second fitting step. Accordingly, unlike the related-art inserter method, in which the wire wound into a ring shape is deformed into an elongate shape, there is no fear in that the wire 3 is stretched.

Further, the parallel elongate portions 4*c*, 4*d* of the coil 4 are arranged with a distance therebetween, which is equal to or slightly larger than the circumferential direction width B of the magnetic pole 2, and the elongate portions 4*c*, 4*d* are moved in the radial direction of the multi-pole armature 1 and inserted into the slots 1*b* with the distance therebetween. Accordingly, the wire 3 is not rubbed against the slots 1*b* and the magnetic pole 2 excessively, and the wire 3 is not damaged. In the above-mentioned second winding step, the wire 3 is wound around the pair of second latch pawls 33, 34 while being adjacent to each other in the Z axis direction. Therefore, according to this embodiment, even when the width W (see FIG. 8) of the slot 1*b* into which the wire 3 is to be inserted is narrow, in the second fitting step, the coil 4 formed of the plurality of layers of the wound wire 3 can be inserted into the slots 1*b* without overlapping in the widthwise direction of the slots 1*b*.

At the time of the second fitting step, the pair of first latch pawls 13, 14 is kept at the position of sandwiching the magnetic pole 2 having the wound wire fitted in the first fitting step from the both sides of the multi-pole armature 1 in the axial direction, and hence the wound wire is kept in a state of being looped around the pair of first latch pawls 13, 14. Thus, the wire 3 inserted into the slots 1*b* in the first fitting step is kept in a straight posture inserted into the slots 1*b*, and hence the wire 3 is not bent in the slots 1*b*. Accordingly, in the second fitting step, when the plurality of layers of the wound wire 3 are inserted into the slots 1*b*, the wire 3 previously inserted does not block the slots 1*b* into which the plurality of layers of the wound wire 3 are to be inserted. Thus, even when the coil 4 is previously fitted onto the adjacent magnetic pole 2, the wire 3 can be inserted into the slots 1*b* relatively easily.

The above-mentioned first indexing step is performed again after the second fitting step or concurrently with the second fitting step, and the above-mentioned respective steps are sequentially repeated in the stated order. In the first indexing step repeated anew, the multi-pole armature 1 is rotated again, and thus another magnetic pole 2 is sent to the winding position. In this case, in a case where the first indexing step repeated anew is performed concurrently with the above-mentioned second fitting step, in the second fitting step, the second moving mechanisms 36, 41 (see FIG. 5) move the pair of second latch pawls 33, 34 from the outer side of the multi-pole armature 1 to the position of sandwiching the magnetic pole 2 in the winding position, and move the pair of second latch pawls 33, 34 in the peripheral direction together with the moving magnetic pole 2. This prevents a fluctuation of a relative positional relationship in the peripheral direction between the pair of second latch pawls 33, 34 and the magnetic pole 2.

Figure 14:
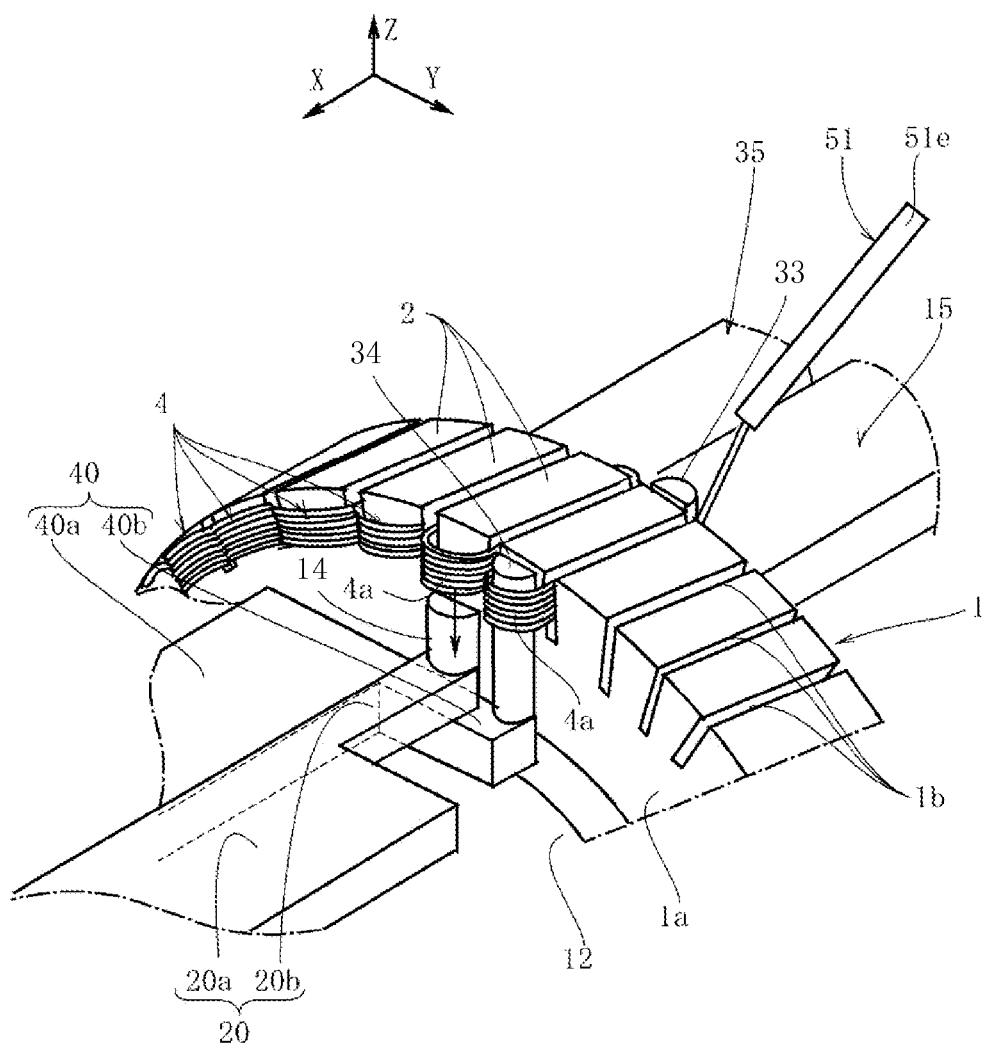
FIG. 14 is a perspective view illustrating a state in which the pair of first latch pawls is pulled out of the wound wire.

At the time of the second fitting step, together with the coil 4, the pair of first latch pawls 13, 14 is kept at the position of sandwiching the magnetic pole 2 from the both sides of the multi-pole armature 1 in the axial direction. However, in the first winding step repeated anew, as indicated by the solid arrow of FIG. 14, the pair of first latch pawls 13, 14 is moved by the first moving mechanisms 16, 21 (FIG. 2) toward the center axis of the multi-pole armature 1. Thus, the coil 4 is left in the slots 1*b*, and the pair of first latch pawls 13, 14 is pulled out of the coil 4. Then, as indicated by the solid arrows of FIG. 9, the first moving mechanisms 16, 21 move the pair of first latch pawls 13, 14 in the X axis direction, thereby avoiding collision of the pair of first latch pawls 13, 14 with the pair of second latch pawls 33, 34. While avoiding such a collision, the pair of first latch pawls 13, 14 is arranged with a distance therebetween so that the pair of first latch pawls 13, 14 sandwiches the magnetic pole 2 in the winding position with a slight gap in the axial direction of the multi-pole armature 1.

In the first winding step and the first fitting step repeated anew, the pair of second latch pawls 33, 34 is kept at the position of fitting the coil 4 onto the magnetic pole 2 and sandwiching the magnetic pole 2 from the both sides of the multi-pole armature 1 in the axial direction. In this manner, the wound wire is kept in a state of being looped around the pair of second latch pawls 33, 34. Thus, the wire 3 inserted into the slots 1*b* in the second fitting step is kept in a straight posture inserted into the slots 1*b*, and hence the wire 3 is not bent in the slots 1*b*. Accordingly, in the repeated first fitting step, when the plurality of layers of the wound wire 3 are inserted into the slots 1*b*, the wire 3 previously inserted does not block the slots 1*b* into which the plurality of layers of the wound wire 3 are to be inserted. Thus, even when the coil 4 is previously fitted onto the adjacent magnetic pole 2, the wire can be inserted into deep portions of the slots 1*b* reliably and relatively easily.

Figure 11:
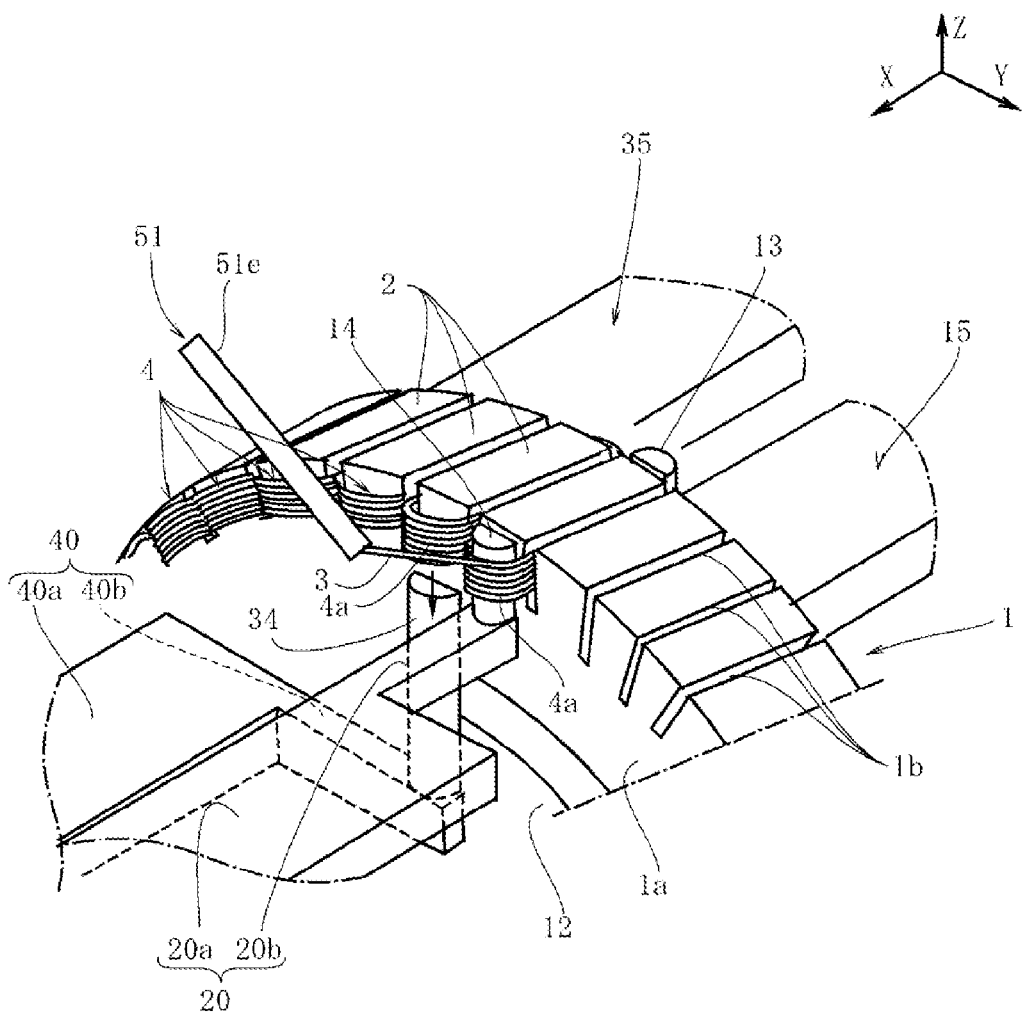
FIG. 11 is a perspective view illustrating a state in which a pair of second latch pawls is pulled out of the wound wire.

Further, at the time of the first fitting step performed again, together with the coil 4, the pair of second latch pawls 33, 34 is kept at the position of sandwiching the magnetic pole 2 from the both sides of the multi-pole armature 1 in the axial direction. In contrast, in the second winding step performed anew, as illustrated in FIG. 11, the pair of second latch pawls 33, 34 is moved by the second moving mechanisms 36, 41 (FIG. 5) toward the center axis of the multi-pole armature 1. Thus, the coil 4 is left in the slots 1*b*, and the pair of second latch pawls 33, 34 is pulled out of the coil 4. Then, as indicated by the solid arrows of FIG. 12, the second moving mechanisms 36, 41 move the pair of second latch pawls 33, 34 in the Z axis direction, thereby avoiding collision of the pair of second latch pawls 33, 34 with the extension portions 15*b*, 20*b* of the moving plates 15, 20 having the pair of first latch pawls 13, 14 attached thereon. While avoiding such a collision, the second moving mechanisms 36, 41 arrange the pair of second latch pawls 33, 34 with a distance therebetween so that the pair of second latch pawls 33, 34 sandwich the magnetic pole 2 in the winding position with a slight gap in the axial direction of the multi-pole armature 1.

The above-mentioned respective steps are repeated sequentially, and winding operation is finished after the coil 4 is fitted onto every magnetic pole 2 of the multi-pole armature 1.

According to this embodiment, the following actions and effects are obtained.

The wire 3 is looped and wound around the pair of latch pawls 13, 14 or the pair of latch pawls 33, 34 provided with a distance therebetween so as to sandwich the magnetic pole 2. Then, the pair of latch pawls 13, 14 or the pair of latch pawls 33, 34 is moved to the position of sandwiching the magnetic pole 2, and the wire 3 wound around the pair of latch pawls 13, 14 or the pair of latch pawls 33, 34 is inserted into the slots 1*b*. The coil 4, which is formed by looping and winding the wire 3 around the pair of latch pawls 13, 14 or the pair of latch pawls 33, 34 arranged with a distance therebetween so as to sandwich the magnetic pole 2, includes the circular arc portions 4*a*, 4*b* that are respectively looped over the pair of latch pawls 13, 14 or the pair of latch pawls 33, 34, and the parallel elongate portions 4*c*, 4*d* elongating straight and continuously with the both end portions of the circular arc portions 4*a*, 4*b* between the pair of latch pawls 13, 14 or between the pair of latch pawls 33, 34.

The pair of latch pawls 13, 14 or the pair of latch pawls 33, 34 is moved from the outer side of the multi-pole armature 1 to the position of sandwiching the magnetic pole 2 in the winding position together with the coil 4 formed of the wire 3 wound around the pair of latch pawls 13, 14 or the pair of latch pawls 33, 34, and the elongate portions 4*c*, 4*d* of the coil 4 are respectively inserted into the slots 1*b* on the both sides of the magnetic pole 2 in the winding position. In this manner, without deforming the coil 4 formed of the wound wire 3, the coil 4 can be fitted around the magnetic pole 2 in the winding position. Therefore, according to the winding apparatus 100 and the winding method of this embodiment, the coil 4 is not deformed when fitting the coil 4. Accordingly, unlike the related-art inserter method, in which the wire wound into a ring shape is deformed into an elongate shape, the coil 4 can be formed around the magnetic pole 2 without stretching the wire.

Further, the parallel elongate portions 4c, 4d of the coil 4 arranged between the pair of latch pawls 13, 14 or between the pair of latch pawls 33, 34 are moved in the radial direction of the multi-pole armature 1 and inserted into the slots 1b while maintaining the distance therebetween. Accordingly, the distance of the parallel elongate portions 4c, 4d is set to be equal to or slightly larger than the circumferential direction width B of the magnetic pole 2 around which the coil 4 is fitted, and thus the elongate portions 4c, 4d are not excessively rubbed against the slots 1b/the magnetic pole 2 into/around which the elongate portions 4c, 4d are to be inserted. Therefore, the wire 3 is not damaged due to the rubbing. Only the wire 3 enters the slots 1b. Accordingly, even when the width of the slot 1b into which the wire 3 is to be inserted is narrow and the nozzle 51e cannot enter the slots 1b, the wire 3 is inserted into the slots 1b without damaging the plurality of layers of the wound wire 3, and thus the coil 4 formed of the plurality of layers of the wound wire 3 can be formed around the magnetic pole 2 reliably.

Further, according to the winding method of this embodiment, in the first winding step and the first fitting step, the pair of second latch pawls 33, 34 is kept at the position of sandwiching, from the both sides of the multi-pole armature 1 in the axial direction, the magnetic pole 2 having the wire fitted thereonto in the second fitting step. In the second winding step and the second fitting step, the pair of first latch pawls 13, 14 is kept at the position of sandwiching, from the both sides of the multi-pole armature 1 in the axial direction, the magnetic pole 2 having the wire fitted thereonto in the first fitting step. Accordingly, the wire 3 inserted into the slots 1b is kept in a straight posture, and hence the wire 3 is not bent in the slots 1b. Accordingly, in the first fitting step or the second fitting step, when the plurality of layers of the wound wire 3 are inserted into the slots 1b, the wire 3 previously inserted does not block the slots 1b into which the plurality of layers of the wound wire 3 are to be inserted. Thus, even when the coil 4 is previously fitted onto the adjacent magnetic pole 2, the wire 3 can be inserted into the slots 1b relatively easily.

Embodiments of this invention were described above, but the above embodiments are merely examples of applications of this invention, and the technical scope of this invention is not limited to the specific constitutions of the above embodiments.

In the above-mentioned embodiment, the wire 3 wound into a ring shape is inserted into the slots 1b formed on the both sides of the single magnetic pole 2 in the peripheral direction, and the coil 4 formed of the wire 3 wound into a ring shape is wound around the single magnetic pole. Accordingly, the pair of first latch pawls 13, 14 and the pair of second latch pawls 33, 34 are formed so as to have the width dimension A in the Y axis direction equal to or slightly larger than the circumferential direction width B of the magnetic pole 2. However, the coil 4 formed of the wire 3 wound into a ring shape is not limited to a coil wound around the single magnetic pole 2, and the coil 4 may be formed into a so-called distributed winding that is obtained by winding the wire around the plurality of magnetic poles 2. In a case of the so-called distributed winding that is obtained by winding the wire 3 around the plurality of magnetic poles 2 in this manner, in a state of sandwiching the magnetic poles 2, the pair of first latch pawls 13, 14 and the pair of second latch pawls 33, 34, around which the wire 3 is to be wound, are formed so as to have the width dimension A in the Y axis direction equal to or slightly larger than an overall circumferential direction width of the plurality of magnetic poles 2 around which the wire is to be wound. Thus, the coil 4 formed of the wire 3 wound into a ring shape can be formed into the so-called distributed winding that is obtained by winding the wire around the plurality of magnetic poles 2.

Further, the above-mentioned embodiment describes the multi-pole armature 1 for use in the resolver, and describes the multi-pole armature 1 in which the plurality of magnetic poles 2 protrude from the annular portion 1a radially outward in a radiate manner. Instead of this, the multi-pole armature 1 as a target for winding is not limited to a multi-pole armature for use in the resolver, but may be used in a motor. Further, although not shown, the plurality of magnetic poles of the multi-pole armature 1 may be configured to project centrally from the annular portion toward a radial direction inner side.

Furthermore, in the embodiment described above, the multi-pole armature 1 includes the straight slots 1b formed parallel to the central axis of the annular portion 1a. As long as the slots 1b are straight, however, a so-called skewed multi-pole armature 1, in which the multi-pole armature 1 is skewed such that the slots 1b are inclined while remaining parallel to each other, may be used instead. Even in the multi-pole armature 1 thus skewed, as long as the slots 1b are straight, without damaging the wire 3, the coil 4 formed of the wound wire 3 can be formed around the magnetic poles 2 of the multi-pole armature 1.

In addition, in the above-mentioned embodiment, the width W of the slot 1b is set to enable two layers of the wire 3 to be inserted into the slot 1b while overlapping in the widthwise direction of the slot 1b, but to disable three layers of the wire 3 to be inserted into the slot 1b while overlapping in the widthwise direction of the slot 1b. Instead of this, as long as the slot 1b enables two layers of the wire 3 to be inserted into the slot 1b while overlapping in the widthwise direction of the slot 1b, the width W of the slot 1b may be set to enable three or more layers of the wire 3 to be inserted into the slot 1b while overlapping in the widthwise direction of the slot 1b.

This application claims priority based on Japanese Patent Application No. 2012-206683 filed with the Japan Patent Office on Sep. 20, 2012, the entire contents of which are incorporated into this specification.

The invention claimed is:

1. A winding apparatus comprising:
   a pair of first latch pawls provided with a distance therebetween so as to sandwich one of magnetic poles of a multi-pole armature from each of two sides of the multi-pole armature in an axial direction thereof;
   a flyer that is configured to feed a wire while rotating around the pair of first latch pawls so as to loop and wind the wire around the pair of first latch pawls; and
   a first moving mechanism that is configured to move the pair of first latch pawls to a position of sandwiching the one of the magnetic poles, and insert the wire wound around the pair of first latch pawls into slots formed between the magnetic poles so that the wire is wound around the one of the magnetic poles.

2. The winding apparatus according to claim 1, further comprising:

an indexing mechanism that is configured to send each of the magnetic poles to a winding position in succession by rotating the multi-pole armature;

a pair of second latch pawls provided with a distance therebetween at a position next to the pair of first latch pawls so as to sandwich the one of the magnetic poles; and a second moving mechanism that is configured to move the pair of second latch pawls from a position at which the wire is to be wound around the pair of second latch pawls by the flyer to a position at which the pair of second latch pawls sandwiches the one of the magnetic poles, and insert the wire wound around the pair of second latch pawls into the slots so that the wire is wound around the one of the magnetic poles.

3. A winding method comprising:

a first indexing step of sending each of magnetic poles to a winding position by rotating a multi-pole armature;

a first winding step of looping and winding a wire around a pair of first latch pawls at an outer side of the multi-pole armature; and a first fitting step of moving the pair of first latch pawls so as to fit the wire wound around the pair of first latch pawls onto one of the magnetic poles in the winding position, the first indexing step, the first winding step, and the first fitting step being performed repeatedly.

4. The winding method according to claim 3, further comprising:

a second indexing step of sending another one of the magnetic poles to the winding position by rotating the multi-pole armature after the first fitting step or concurrently with the first fitting step;

a second winding step of looping and winding the wire around a pair of second latch pawls at the outer side of the multi-pole armature; and a second fitting step of moving the pair of second latch pawls so as to fit the wire wound around the pair of second latch pawls onto the another one of the magnetic poles in the winding position, the first indexing step being performed after the second fitting step or concurrently with the second fitting step.

5. The winding method according to claim 4, wherein in the first winding step and the first fitting step, the pair of second latch pawls is kept at a position of sandwiching, from both sides of the multi-pole armature in an axial direction thereof, the another one of the magnetic poles having the wire fitted thereonto in the second fitting step, and wherein in the second winding step and the second fitting step, the pair of first latch pawls is kept at a position of sandwiching, from the both sides of the multi-pole armature in the axial direction thereof, the one of the magnetic poles having the wire fitted thereonto in the first fitting step.

\* \* \* \* \*